United States Patent
Desai et al.

(10) Patent No.: US 10,891,259 B2
(45) Date of Patent: *Jan. 12, 2021

(54) USER DRIVEN DATA PRE-FETCH

(71) Applicant: Maginatics LLC, Mountain View, CA (US)

(72) Inventors: Rajiv Desai, Mountain View, CA (US); Vaibhav Kamra, Sunnyvale, CA (US)

(73) Assignee: Maginatics LLC, Mountain View, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 15/961,634

(22) Filed: Apr. 24, 2018

(65) Prior Publication Data

US 2018/0239778 A1    Aug. 23, 2018

Related U.S. Application Data

(63) Continuation of application No. 14/675,451, filed on Mar. 31, 2015, now Pat. No. 9,984,088.

(51) Int. Cl.
  *G06F 16/172*   (2019.01)
  *H04L 29/08*    (2006.01)
  *G06F 16/182*   (2019.01)

(52) U.S. Cl.
  CPC .......... *G06F 16/172* (2019.01); *G06F 16/183* (2019.01); *H04L 67/06* (2013.01); *H04L 67/1097* (2013.01); *H04L 67/2847* (2013.01)

(58) Field of Classification Search
  None
  See application file for complete search history.

(56) References Cited

U.S. PATENT DOCUMENTS

| | | | |
|---|---|---|---|
| 9,984,088 B1* | 5/2018 | Desai | G06F 16/172 |
| 2002/0057678 A1 | 5/2002 | Jiang | |
| 2006/0082809 A1 | 4/2006 | Loukipoudis | |
| 2009/0222453 A1* | 9/2009 | Naineni | G06F 16/172 |
| 2012/0011588 A1* | 1/2012 | Milener | G06F 21/51 726/24 |
| 2012/0066677 A1 | 3/2012 | Tang | |
| 2012/0236201 A1* | 9/2012 | Larsen | G06Q 10/10 348/468 |
| 2013/0305039 A1 | 11/2013 | Gauda | |
| 2014/0053064 A1* | 2/2014 | Weber | G06F 16/9574 715/235 |
| 2014/0080428 A1* | 3/2014 | Rhoads | H04W 4/70 455/88 |
| 2014/0108335 A1 | 4/2014 | Chan | |
| 2014/0115114 A1* | 4/2014 | Garmark | H04L 65/60 709/219 |
| 2014/0129665 A1 | 5/2014 | Chan | |

(Continued)

*Primary Examiner* — Wilson Lee

(74) *Attorney, Agent, or Firm* — Van Pelt, Yi & James LLP

(57) ABSTRACT

Techniques to provide access to file system information are disclosed. In various embodiments, an indication that a user input associated with creating a local copy of a file system object has been received is received at a file system client. The file system client determines that a user-driven pre-fetch option has been set with respect to the file system object. The file system client pre-fetches content data associated with the file system object, based at least in part on the determination that the pre-fetch option has been set with respect to the file system object.

19 Claims, 13 Drawing Sheets

(56) References Cited

U.S. PATENT DOCUMENTS

| | | | |
|---|---|---|---|
| 2014/0179441 A1* | 6/2014 | Morrison, III | H04N 21/251 |
| | | | 463/43 |
| 2014/0282636 A1 | 9/2014 | Petander | |
| 2014/0365861 A1 | 12/2014 | Lasmarias | |
| 2015/0172469 A1 | 6/2015 | Da Silva | |
| 2015/0235015 A1 | 8/2015 | Holler | |
| 2015/0278330 A1* | 10/2015 | Hawa | G06F 16/275 |
| | | | 709/203 |
| 2015/0370902 A1 | 12/2015 | Oztaskent | |
| 2015/0372933 A1 | 12/2015 | Cai | |
| 2016/0182582 A1 | 6/2016 | Wagenaar | |
| 2016/0255535 A1* | 9/2016 | De Foy | H04L 67/2804 |
| | | | 370/236 |

* cited by examiner

USER DRIVEN DATA PRE-FETCH

CROSS REFERENCE TO OTHER APPLICATIONS

This application is a continuation of co-pending U.S. patent application Ser. No. 14/675,451, entitled USER DRIVEN DATA PRE-FETCH filed Mar. 31, 2015 which is incorporated herein by reference for all purposes.

BACKGROUND OF THE INVENTION

Applications and/or tools used to provide and/or enable a user to navigate a file system user interface displayed at a client device (e.g., user applications, such as content creation applications, finders, browsers, etc.) typically interact with the file system to obtain the information required to be displayed. In response to certain user actions, e.g., opening a folder, dragging and drop a folder onto the user's "desktop" or other area associated with copying a file to local storage, etc., the application or tool may be configured to anticipate a future user action and to pre-fetch from the file system the information that may be required to respond to the anticipated action, if the user were to perform the action. For example, if a folder is dragged and dropped onto the user's desktop, the user may be expected to open the folder (e.g., double click on it) to view the contents. As a result, the application or tool that displayed the file system information via a browse or other navigation interface may be configured to pre-fetch the folder contents information from the file system, to be ready to display that information in response to the folder being opened.

In the case of a distributed file system, the file system metadata typically is accessed from a remote file system metadata server. One or more remote procedure calls or other requests may be required to pre-fetch file system information. In addition, the application/tool used to display the file system information may not be configured to obtain the information directly from the file system metadata server. Instead, a file system client or agent at the client device may act as an intermediary. As a result, potentially unnecessary pre-fetch actions by applications or tools used to display file system information may result in undesired use of both client device and network resources, and could result in undesired latency.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

User-driven selective pre-fetch of file system information, in the context of a distributed file system, is disclosed. In various embodiments, a user if provided an menu option or other control to be used to provide a hint or other explicit indication as to whether the user wants file system information to be pre-fetched in response to certain user inputs and/or actions. If the hint has been provided and the user performs the action, a pre-fetch operation is performed by a file system client or agent on the client device. If the hint has not been provided, in various embodiments, the file system client or agent will not automatically pre-fetch the file system information.

Figure 1:
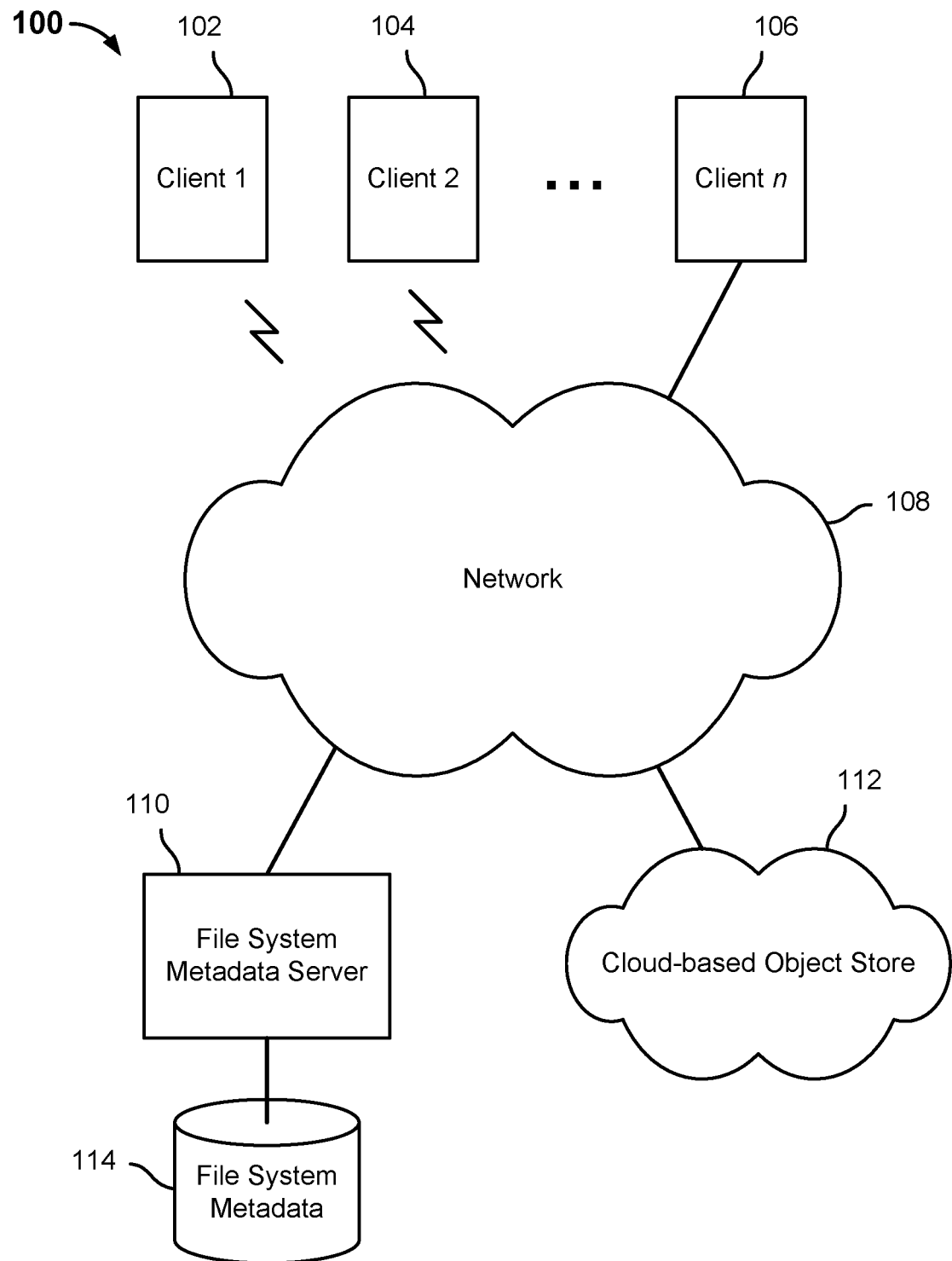
FIG. 1 is a block diagram illustrating an embodiment of a distributed file system and environment.

FIG. 1 is a block diagram illustrating an embodiment of a distributed file system and environment. In the example shown, the distributed file system environment 100 includes a plurality of client systems and/or devices, represented in FIG. 1 by clients 102, 104, and 106. In the example shown, the clients connect (wireless or otherwise) to a network 108, e.g., one or more of a local area network (LAN), a wide area network (WAN), the Internet, and/or one or more other public and/or private networks. The clients have access via network 108 to a file system metadata server 110. Applications on the respective clients, such as clients 102, 104, and 106, make file system calls, which result in various embodiments in corresponding remote calls being made to file system metadata server 110. For example, a file system client, agent, or other entity on the client may intercept or otherwise receive calls by the application to a local (e.g., native) file system, and may redirect such calls to an agent configured to make corresponding remote calls to file system metadata server 110 (e.g., transparently to the application).

In the example shown, data comprising objects stored in the file system, such as files, is stored in a cloud-based object store 112. In some embodiments, files may be segmented into a plurality of segments or "chunks", each of which is stored in a corresponding location in the cloud-based object store. File system calls are made to file system metadata server 110, which stores file system metadata in a file system metadata storage 114, e.g., in a database or other data store. File system metadata server 110 may store in file system metadata store 114, for example, a segment or "chunk" map for each file or other object stored and represented in the file system. For example, for each file name (e.g., pathname) the file system metadata server 110 may store in a corresponding segment map a hash or other representation of each segment, and for each a corresponding location in which the segment is (or is to be) stored in cloud-based object store 112. Other file system metadata, such as metadata typically stored by a file system, may be stored by file system metadata server 110 in file system metadata store 114. Examples include, without limitation, a directory, file, or other node/object name; an identification of parent and/or child nodes; a creation time; a user that created and/or owns the object; a time last modified and/or other time; an end-of-file (EOF) or other value indicative of object size; security attributes such as a classification, access control list, etc.; and/or other file system metadata.

While in the example shown in FIG. 1 the file system metadata server 110 and the cloud-based object store 112 are shown as separate systems, located in different networks and/or physical locations, in other embodiments the file system metadata and file system content data may be stored together, e.g., both on cloud-based resources and/or both on enterprise or other network servers, etc.

Figure 2:
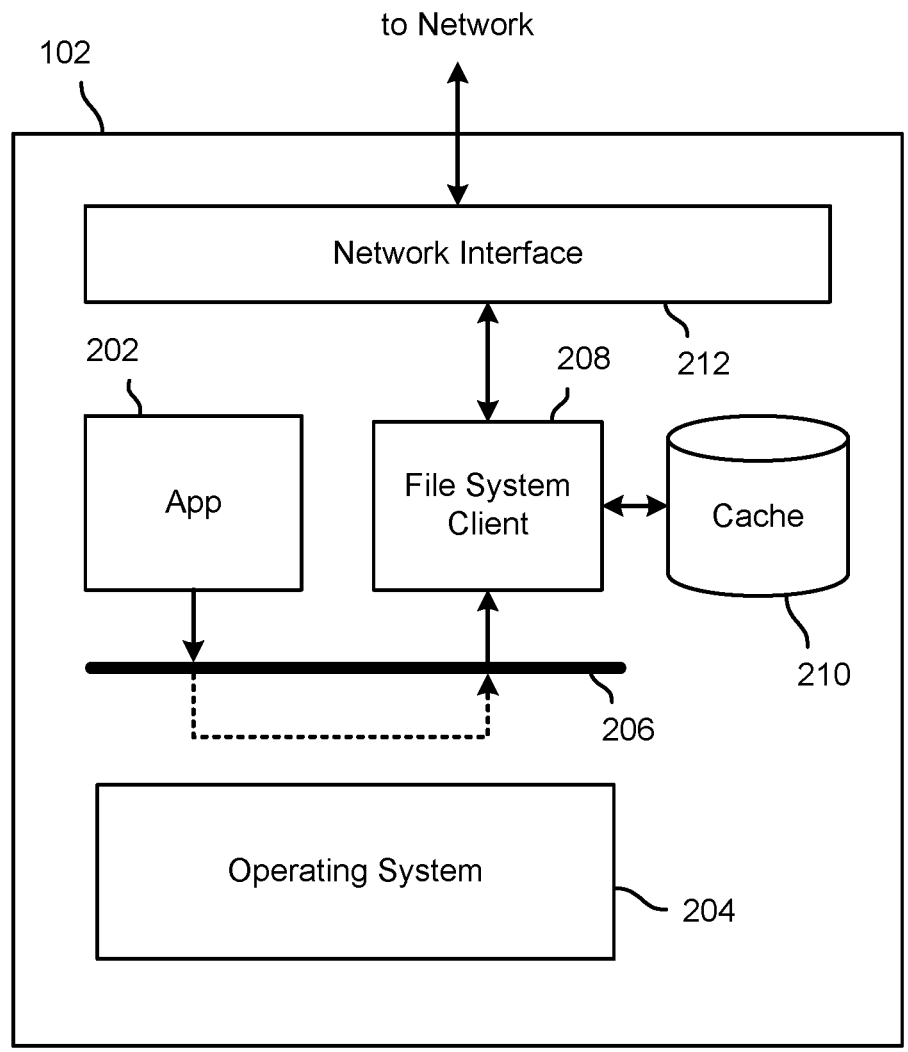
FIG. 2 is a block diagram illustrating an embodiment of a client system.

FIG. 2 is a block diagram illustrating an embodiment of a client system. In the example shown, the client system/device 102 of FIG. 1 is shown to include an application 202 running in an environment provided by an operating system 204. The operating system 204 includes a kernel (not shown) and other components configured to provide services and/or functionality to applications such as application 202. For example, operating system 204 may include and/or be configured to provide access to a native file system (not shown) of client system 102. Application 202 may be configured to make file system calls to the native file system, e.g., to store files or other objects created by/using application 202, to modify, move, or delete such objects, etc. In the example shown, file system calls made by application 202, represented in FIG. 2 by the downward pointing arrow originating in the block labeled "app" (202), are intercepted by a kernel module (or other component) 206 and redirected to a file system client (or other file system agent) 208. In some embodiments, file system agent 208 comprises a client application running in user space. In some embodiments, file system agent 208 comprises a kernel or other operating system component or module. File system client 208 in this example has associated therewith a local cache 210. In various embodiment, cache 210 may be used to buffer and/or otherwise stage file data prior to its being sent to remote storage (e.g., cloud-based object store 112 of FIG. 1), and/or to facilitate access to data stored previously but to which access may be requested later.

The client system 102 includes a network communication interface 212 that provides network connectivity, e.g., to a network such as network 108 of FIG. 1. For example, a request from app 202 to access a file stored remotely in various embodiments may result in file system client 208 making a remote call, via network communication interface 212, for example to a file system metadata server such as server 110 of FIG. 1.

In various embodiments, file system client 208 may be configured to store in a metadata write buffer comprising or otherwise associated with file system client 208 and/or cache 210 one or more file system operations and/or requests affecting file system metadata comprising a portion of the file system metadata with respect to which a file system metadata write lease is held by file system client 208. For example, file system operations affecting metadata may be buffered as received, e.g., as a result of local file system calls by applications such as application 202 of FIG. 2, and may be communicated to the remote file system metadata server asynchronously and/or upon occurrence of an event, e.g., receipt of an indication that a metadata write lease "break" event has been received and/or has occurred. For example, a second client system may indicate a desire and need to perform operations affecting a portion of the file system metadata with respect to which a first client system holds a lease, result in a "break" communication being sent to the first client system, which in turns "flushes" at least those operations in the buffer that affect the portion of metadata with respect to which the lease had been held.

Figure 3:
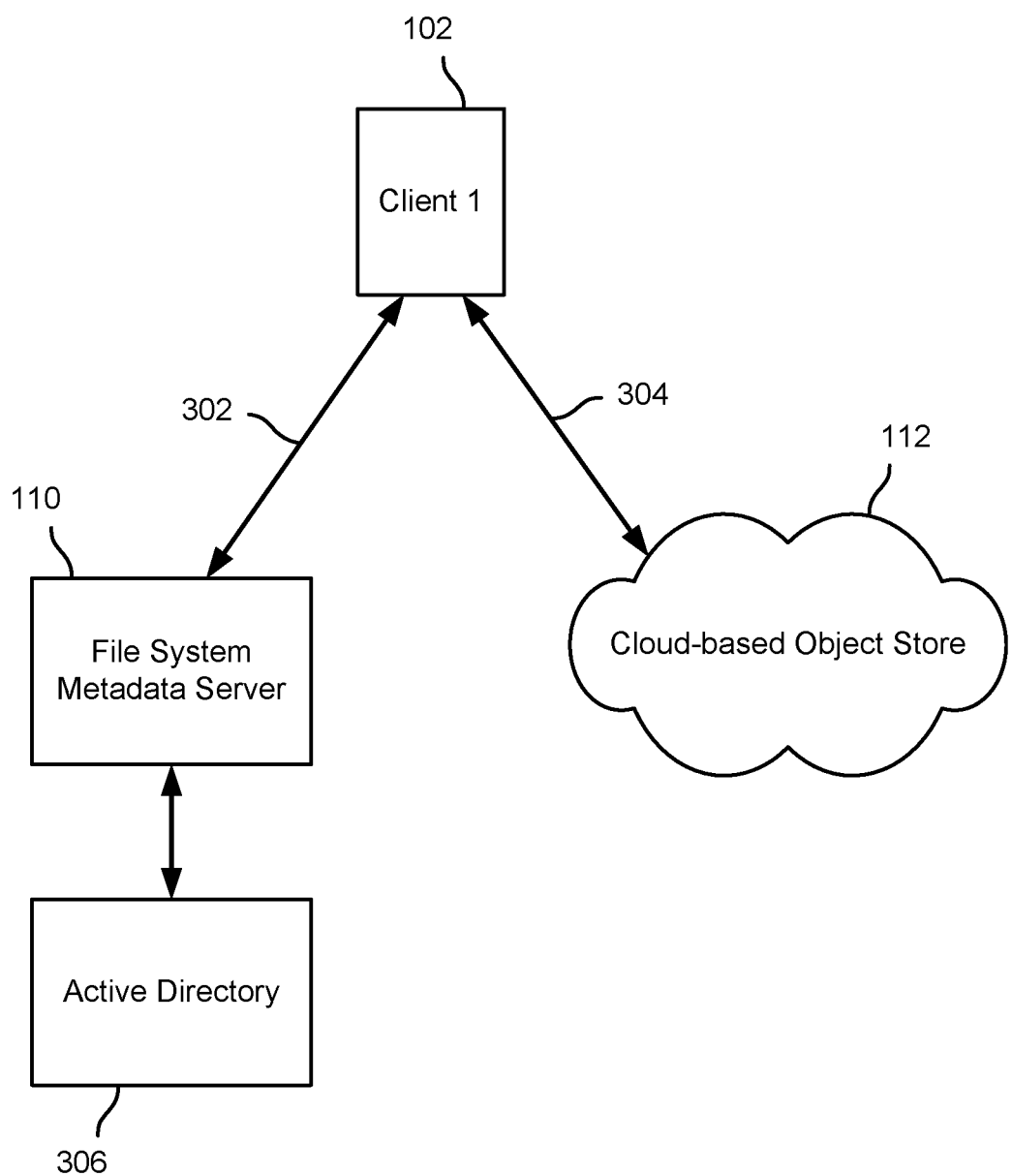
FIG. 3 is a block diagram illustrating an embodiment of a distributed file system.

FIG. 3 is a block diagram illustrating an embodiment of a distributed file system. In the example shown, client 102 communicates via a secure session-based connection 302 with file system metadata server 110. In addition, client 102 communicates with cloud-based object store 112 via a TCP/IP or other connection that enables client 102 to store objects (e.g., file segments or "chunks") via HTTP "PUT" requests and to retrieve segments ("chunks") via HTTP "GET" requests. In various embodiments, client 102 (e.g., a file system client or other agent running on client 102) sends and receives distributed file system "control plane" communications via secure connection 302 (e.g., file system operations that change or require the processing and/or use of file system metadata), whereas communicates sent via connection 304 may be considered to comprising a "data plane" via which file system object data (i.e., segments or "chunks") may be stored and/or retrieved. In the example shown, file system metadata server 110 has access to active directory 306, which in various embodiments may comprise information usable to authenticate users of clients such as client 102.

In various embodiments, file system objects, such as files, may be stored by a client on which a distribute file system client or other agent has been installed. Upon receiving a request to store (or modify) a file system object, in various embodiments the file system client segments the object into one or more segments or "chunks" and computes a reference (e.g., a hash) for each. The references are included in a file system request sent to the file system metadata server, e.g., via a secure connection such as connection 302 of FIG. 3. The file system metadata server returns information to be used by the file system client to store (non-duplicate) segments/chunks in the cloud-based object store by sending the segment data directly to the cloud-based object store, e.g., via PUT requests sent via a connection such as connection 304 of FIG. 3.

Figure 4:
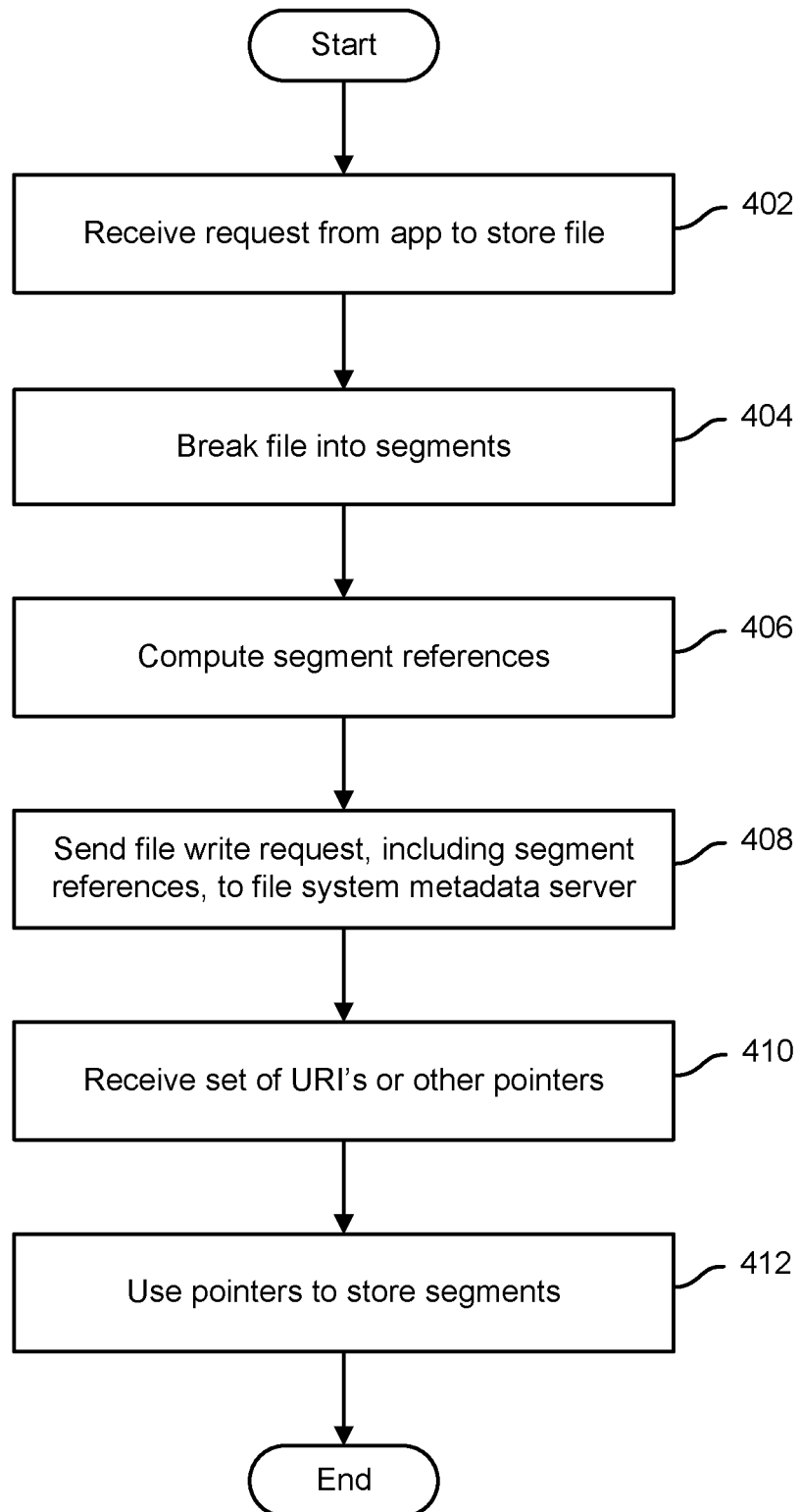
FIG. 4 is a flow chart illustrating an embodiment of a process to store a file or other file system object in a distributed file system.

FIG. 4 is a flow chart illustrating an embodiment of a process to store a file or other file system object in a distributed file system. In various embodiments, the process of FIG. 4 may be performed on a client system or device, e.g., by a file system client or other agent running on the client system/device, such as file system client 208 of FIG. 2. In the example shown, a request is received, e.g., from an application, to store a file (402). The file is segmented into one or more segments (404). For each segment, a segment reference, e.g., a hash, is computed (406). A file write request that includes the segment references is sent to the file system metadata server (408). A set of uniform resource indicators (URI's) or other pointers is received from the file system metadata server (410). In various embodiments, the set of pointers may include pointers only for those segments not already stored by the distributed file system. The received pointers are used to store segments, e.g., via HTTP "PUT" requests sent directly to the cloud-based object store (412).

Figure 5:
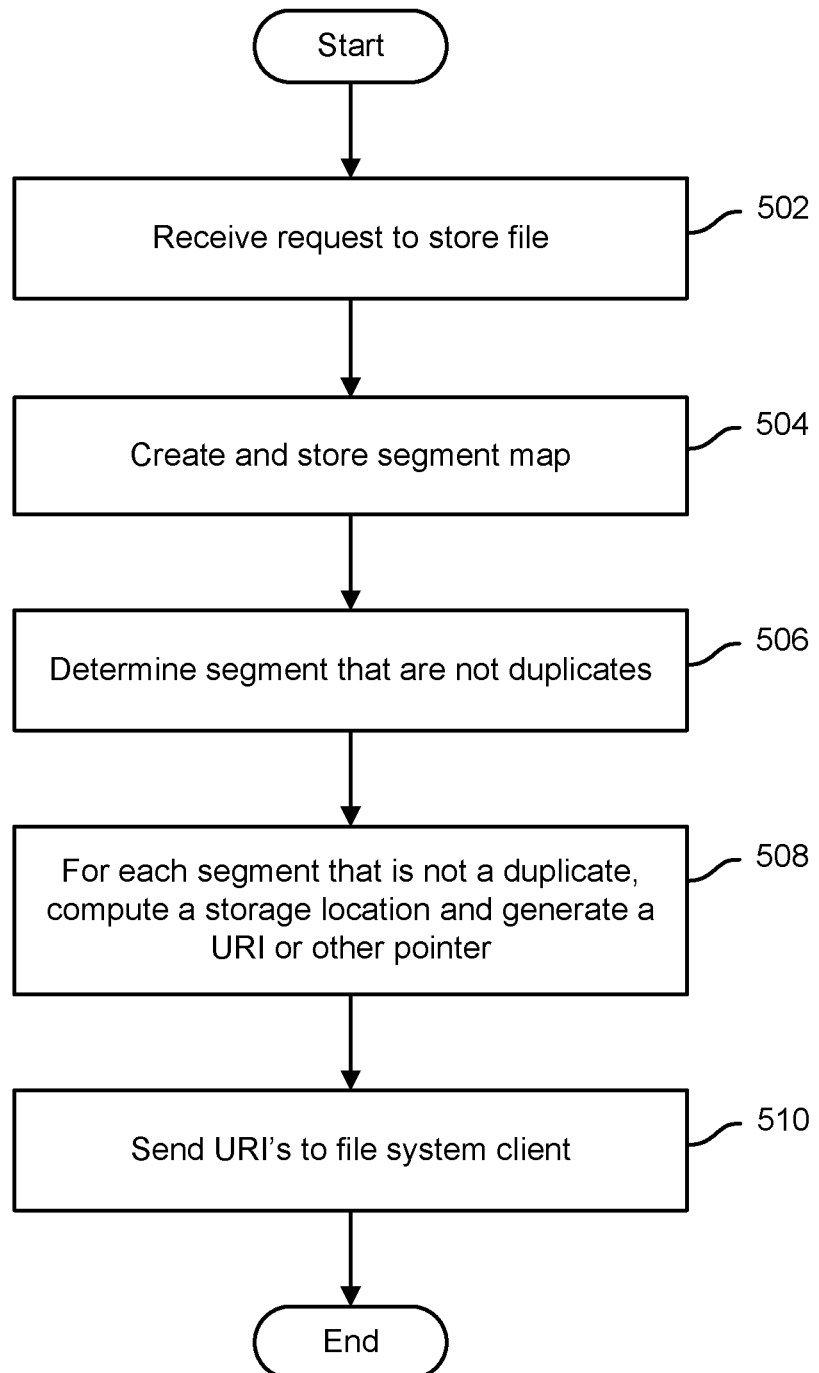
FIG. 5 is a flow chart illustrating an embodiment of a process to handle a request to store a file or other file system object in a distributed file system.

FIG. 5 is a flow chart illustrating an embodiment of a process to handle a request to store a file or other file system object in a distributed file system. In various embodiments, the process of FIG. 5 may be performed by a file system metadata server, such as file system metadata server 110 of FIG. 1. In the example shown, a request to store a file is received (502). A segment ("chunk") map that associates the file system object name and/or other identifier (e.g., file name, pathname) with a set of one or more segment references (e.g., hash values) is created (504). Segments that are not duplicates of segments already stored by the distributed file system are identified, for example based on the segment references (506). For each segment that is not a duplicate, a storage location is computed (e.g., based at least in part on all or part of the segment reference) and a URI or other pointer usable to store the segment directly in the cloud-based data store is generated (508). In various embodiments, the URI or other pointer is signed cryptographically by the file system metadata server. The URI may have an expiration time by which it must be used to store the segment. The URI's are sent to the file system client from which the request to store the file was received (510).

Figure 6:
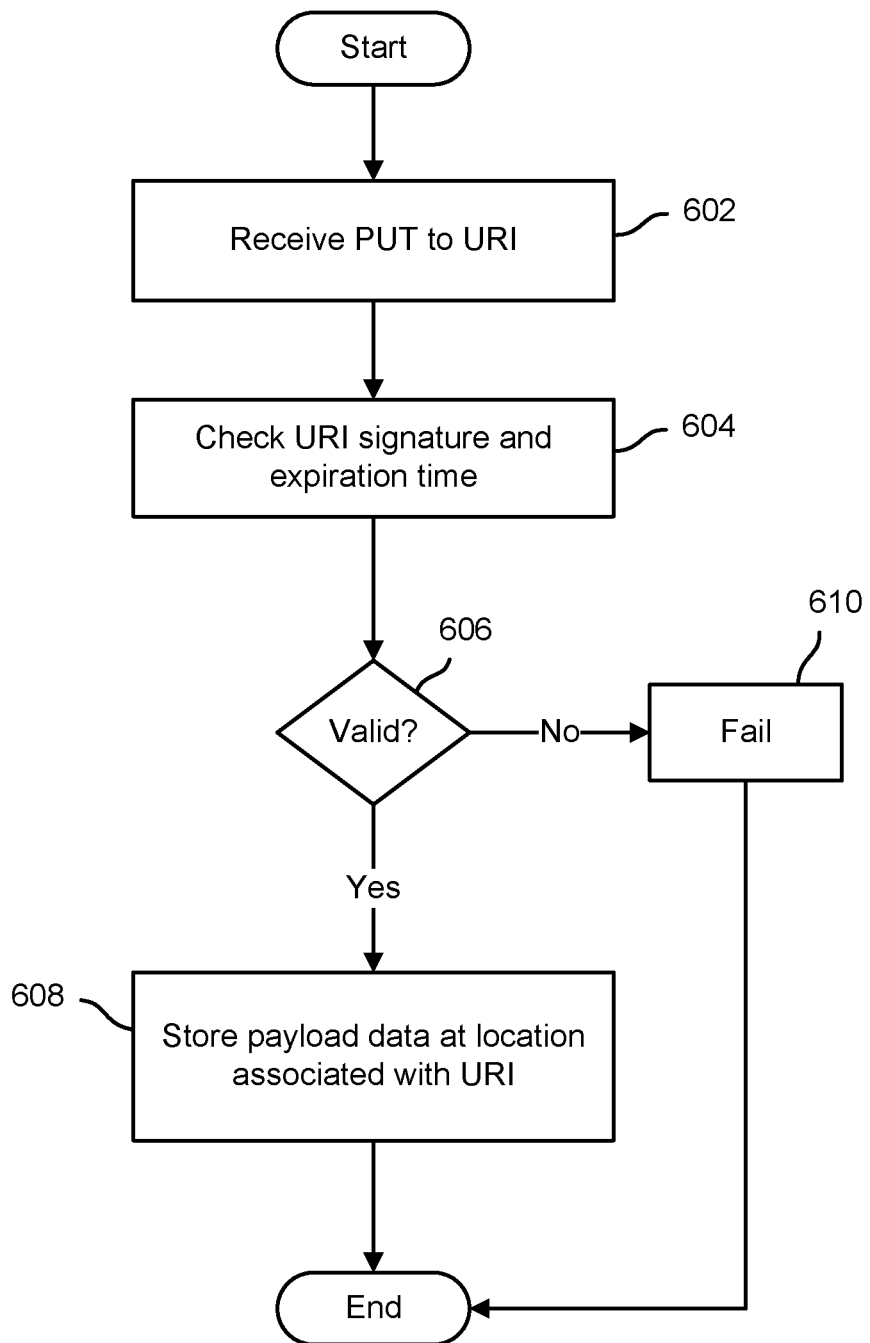
FIG. 6 is a flow chart illustrating an embodiment of a process to store file segment or "chunk" data associated with a distributed file system.

FIG. 6 is a flow chart illustrating an embodiment of a process to store file segment or "chunk" data associated with a distributed file system. In various embodiments, the process of FIG. 6 may be performed by a cloud-based object store, such as object store 112 of FIG. 1. In the example shown, a "PUT" request associated with a URI specified in the request is received (602). A cryptographic signature associated with the URI and an expiration time encoded in the URI are checked (604). For example, the cloud-based object store may be provisioned to check that the URI has been signed by a trusted file system metadata server and/or that an expiration time of the URI has not elapsed. If the URI is determined to be currently valid (606), a payload data associated with the PUT request, e.g., file system object segment or "chunk" data, is stored in a location associated with the URI (608). If the URI is determined to not be valid (606), the PUT request fails (610), and the file system client receives a response indicating it must obtain a new URI from the file system metadata server.

In various embodiments, file system objects, such as files, may be retrieved by a client on which a distribute file system client or other agent has been installed. Upon receiving a request to access a file system object, in various embodiments the file system client sends a file access request to the file system metadata server, e.g., via a secure connection such as connection 302 of FIG. 3. The file system metadata server returns information (e.g., one or more URI's or other pointers) to be used by the file system client to retrieve segments/chunks directly from the cloud-based object store, e.g., via GET requests sent via a connection such as connection 304 of FIG. 3.

Figure 7:
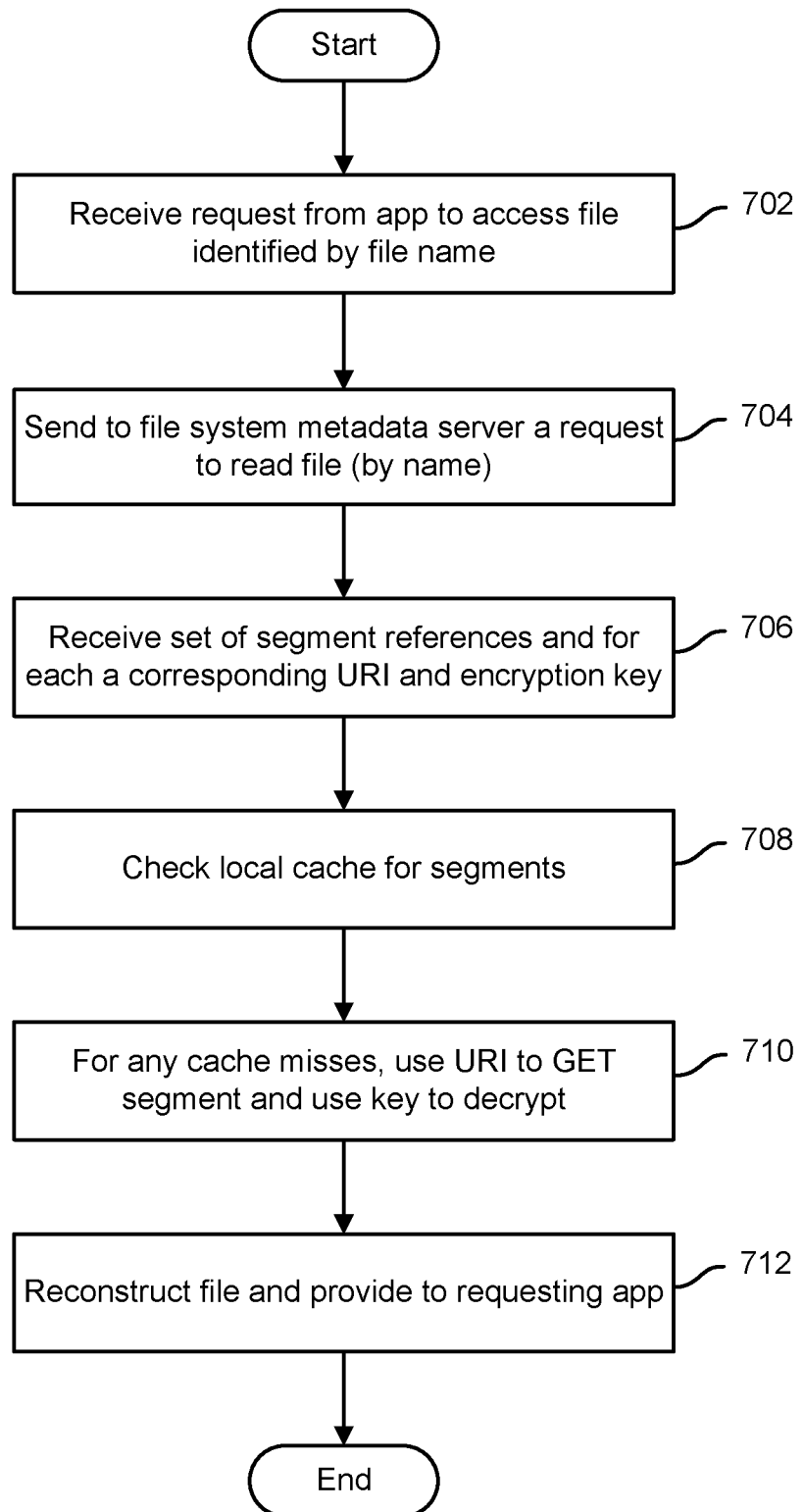
FIG. 7 is a flow chart illustrating an embodiment of a process to access a file or other file system object stored in a distributed file system.

FIG. 7 is a flow chart illustrating an embodiment of a process to access a file or other file system object stored in a distributed file system. In various embodiments, the process of FIG. 4 may be performed on a client system or device, e.g., by a file system client or other agent running on the client system/device, such as file system client 208 of FIG. 2. In the example shown, a request to access a file system object, e.g. a file identified by file name, is received from an application (702). A request is sent to a file system metadata server to retrieve the file (704). A set of segment references, and for each a corresponding URI and encryption key, is received from the file system metadata server (706). A local cache is checked to determine whether any required segments are present in the cache (708). For all segments not present in the cache, the associated URI is used to send a GET request to retrieve the segment from the cloud-based object store, and the associated key is used to decrypt the segment once it has been received from the object store in encrypted form (710). The segments are used to reconstruct the file and provide access to the file to the application from which the access request was received (712).

Figure 8:
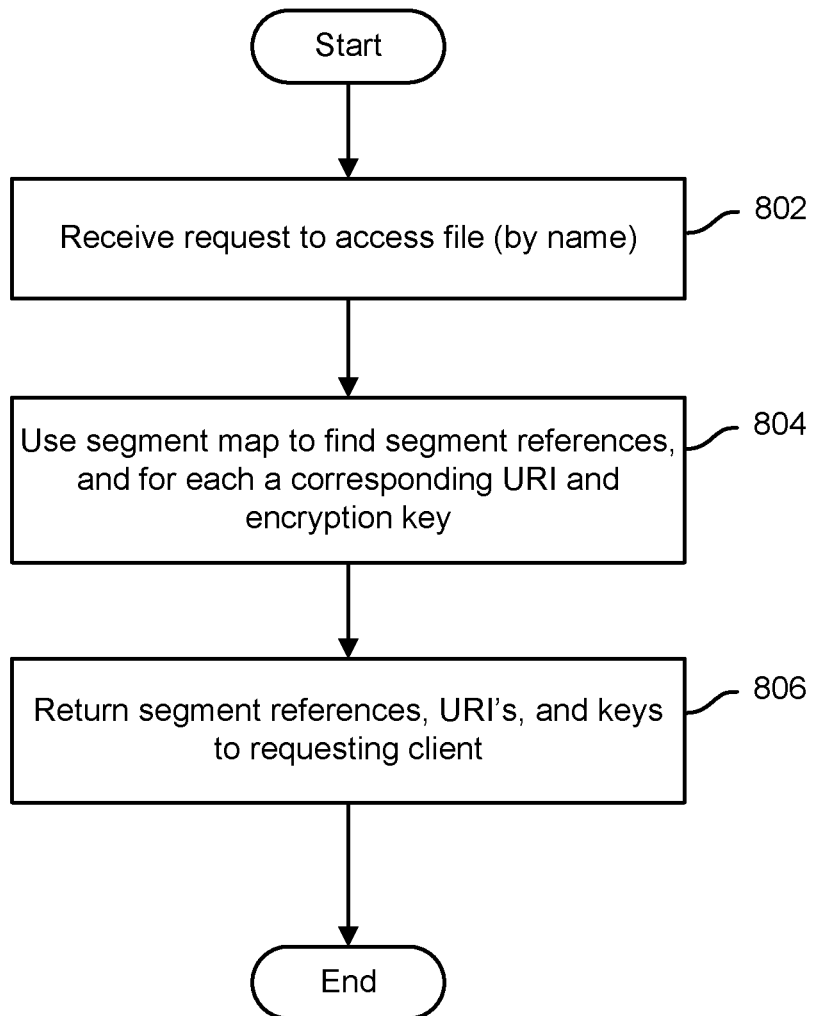
FIG. 8 is a flow chart illustrating an embodiment of a process to handle a request to access a file or other file system object stored in a distributed file system.

FIG. 8 is a flow chart illustrating an embodiment of a process to handle a request to access a file or other file system object stored in a distributed file system. In various embodiments, the process of FIG. 5 may be performed by a file system metadata server, such as file system metadata server 110 of FIG. 1. In the example shown, a request to access a named file is received (802). A segment map associated with the file is retrieved and used to determine a set of segment references (e.g., hashes), and for each a corresponding URI indicating where the segment is stored in the cloud-based segment store and an encryption key usable to decrypt the segment (804). The segment references, URI's, and keys are returned to the file system client from which the file access request was received (806).

User driven pre-fetch of file system information is disclosed.

Figure 9:
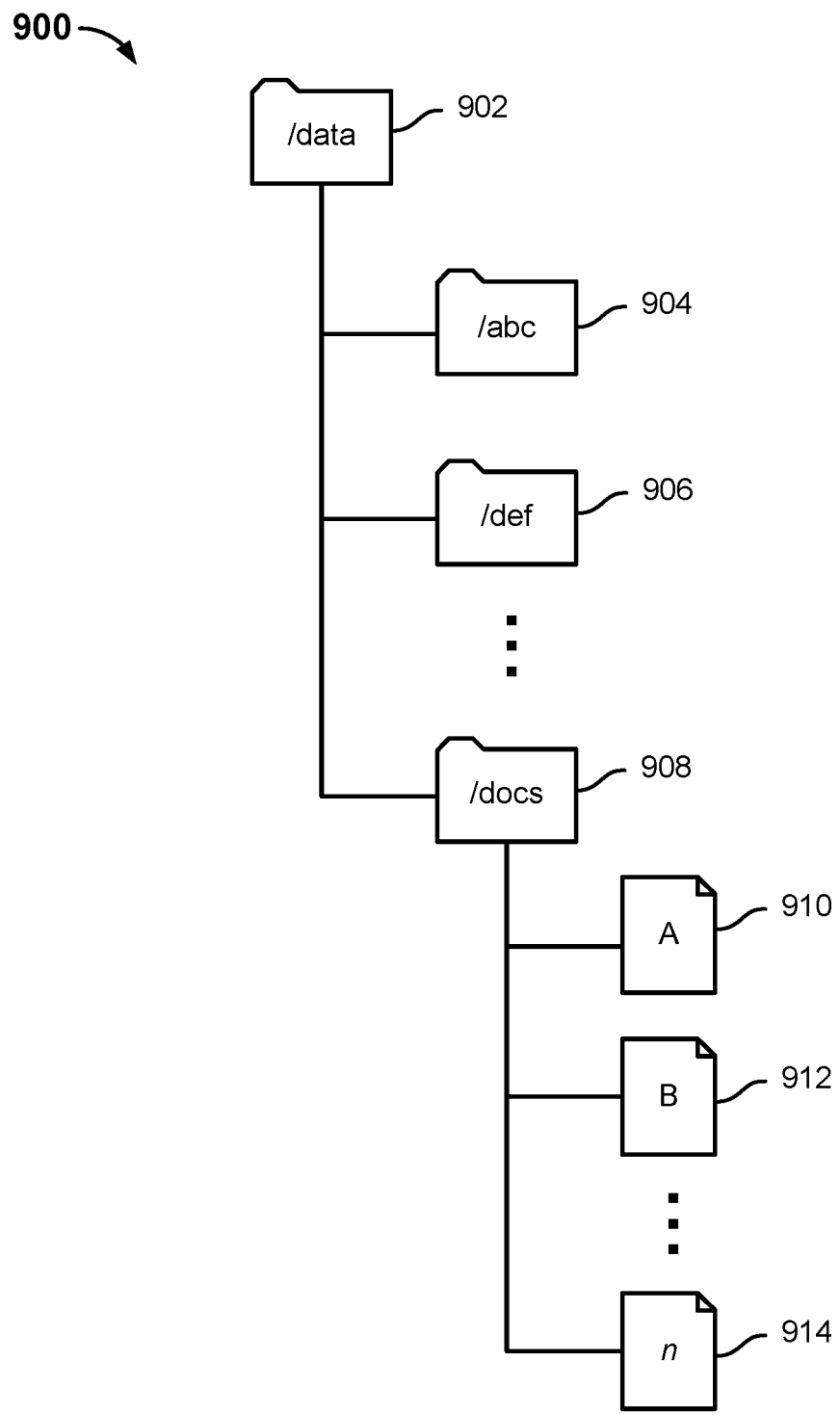
FIG. 9 is a block diagram illustrating an example of a file system hierarchy.

FIG. 9 is a block diagram illustrating an example of a file system hierarchy. In various embodiments, the file system hierarchy shown in FIG. 9 may be associated with a set of files associate with a user of a client device, such as the devices 102, 104, and 106 of FIG. 1. For example, the user may have logged into a corporate network and/or service, and may have presented a token or other credential to a file system metadata server, such as server 110 of FIGS. 1 and 3, and have been determined by the file system metadata server to be associated with the hierarchical set of file system content shown in FIG. 9. In the example shown, the file system hierarchy 900 includes a root folder 902, labeled "/data" in this example. The root folder 902 has a plurality of subfolders, represented in FIG. 9 by subfolders 904, 906, and 908. The subfolder 908, labeled "/docs", is shown in this example to include a plurality of files, represented in FIG. 9 by files 910, 912, and 914.

Figure 10:
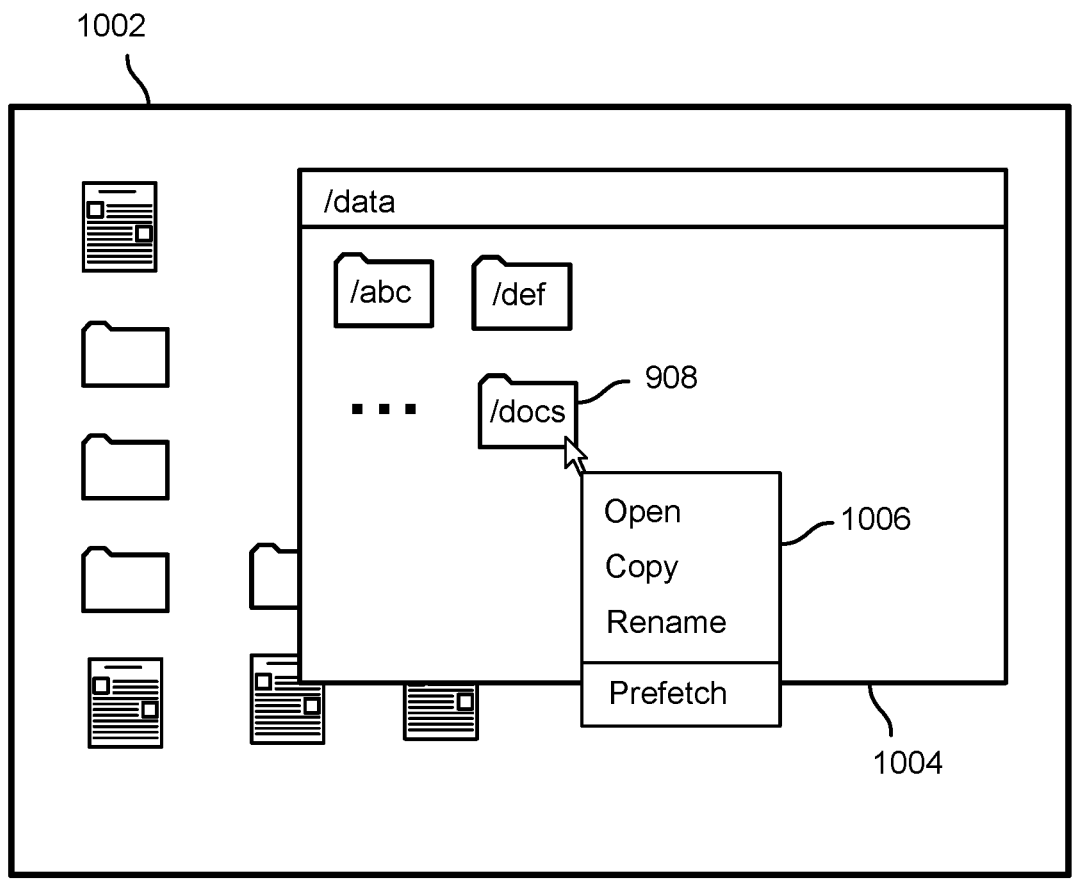
FIG. 10 is a block diagram illustrating an embodiment of a file system user interface to provide a user pre-fetch hint.

FIG. 10 is a block diagram illustrating an embodiment of a file system user interface to provide a user pre-fetch hint. In various embodiments, the user interface of FIG. 10 may be displayed on a client device, such as the devices 102, 104, and 106 of FIG. 1. In the example shown, a desktop 1002 is displayed. File system information is displayed in a window 1004 layered on top of desktop 1002. For example, an application, such as application 202 of FIG. 2, e.g., a user application such as Microsoft Word® or a file browsing tools such as Microsoft Explorer® or Mac OS X Finder® may have been used to browse file system information, resulting in the file system information shown in the window 1004. In this example, the subfolders of the root folder 902 are displayed as labeled folder icons, including subfolder 908. In this example, a contextual menu 1006 is displayed. In various embodiments, contextual menu 1006 may be displayed in response to a user using a mouse or other input device to move the cursor to a location associated with (e.g., occupied at least partly by) the icon representing folder 908, and entering a "right click" or other prescribed input.

In the example shown in FIG. 10, the contextual menu 1006 includes options conventionally associated with file system operations and interfaces, i.e., "open", "copy", and "rename". In addition, however, an option to set a "pre-fetch" hint is provided. In some embodiments, selection of the hint would result in a visual indication that the "pre-fetch" hint had been set or activate, such as a check mark or other mark adjacent to the word "pre-fetch", an additional text indicating the setting is active, such as "pre-fetch on", etc. In various embodiments, the user may use the option as displayed and/or an associated control, such as a button, slider, etc., to toggle the pre-fetch setting on or off.

In various embodiments, the pre-fetch option is caused to be displayed in the context menu 1006 by operation of software code comprising or otherwise associated with the distributed file system, such as a file system client or agent running on the device. The software code registers the menu option as required (e.g., API or other interface of the application used to retrieve and/or display the file system information, API or other call to the operating system, etc.) and defines the events that should result in the entity registering the menu option, e.g., the file system client, being informed that the user has used the menu option toggled the pre-fetch setting "on" or "off".

In various embodiments, if the pre-fetch hint has been turned "on" in the context of a file system information display such as shown in the window 1004 in the example shown in FIG. 10, then file system client or agent will act, without (further) request from the application or tool used to display the file system information, to pre-fetch file system information if the user performs certain actions. For example, in the example shown in FIG. 10, if the pre-fetch hint were set to "on" and the user were to drag and drop the folder 908 to the desktop 1002, the file system client/agent in response would pre-fetch file system information that would be required to display the contents of folder 908 in the event the user were to open the folder as represented on the desktop. By contrast, if the user had set the pre-fetch hint to "off" and performed the same action of dragging and dropping folder 908 to the desktop, no pre-fetch would be performed by the file system client/agent.

In various embodiments, a scope of the pre-fetch hint may be configured, configurable, and/or determined based at least in part on user input. For example, in some embodiments, the "pre-fetch" hint if set via the menu 1006 as shown in FIG. 10 would be limited in scope to the folder 908, resulting in pre-fetch only of the contents of that folder. In some embodiments, the scope may be global or may extend to all folders in the same hierarchy as the folder in the context of which the hint was set, all subfolders, files, or other objects in the same folder as the folder in the context of which the hint was set, etc.

Figure 11:
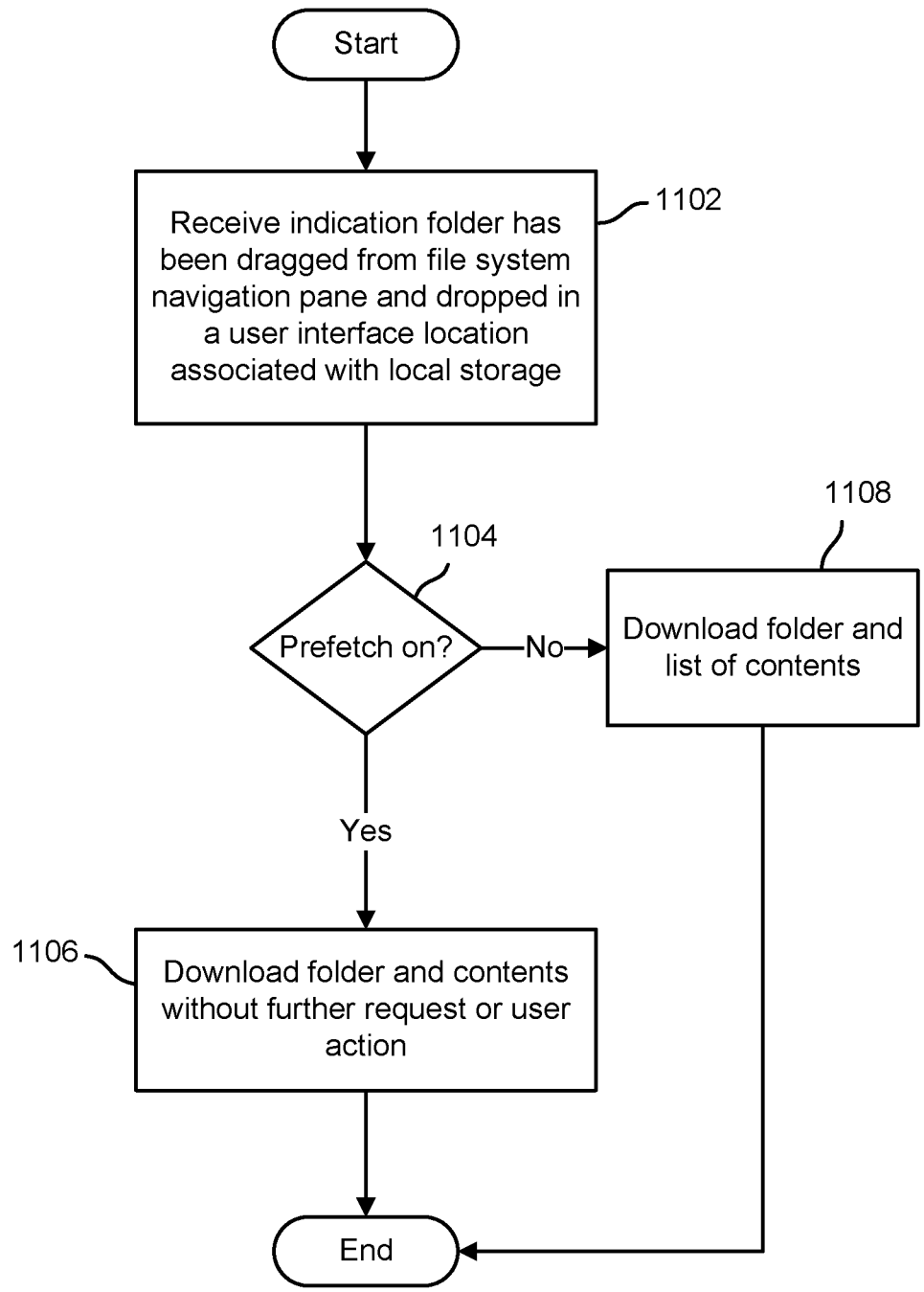
FIG. 11 is a flow chart illustrating an embodiment of a process to download file system data.

FIG. 11 is a flow chart illustrating an embodiment of a process to download file system data. In various embodiments, the process of FIG. 11 may be implemented by a file system client, such as file system client 208 of FIG. 2. In the example shown, an indication is received that a folder has been dragged from a file system navigation pane and dropped in a user interface location associated with local storage (e.g., a desktop, folder associated with a local drive, etc.) (1102). If a user settable pre-fetch hint has been set to "on" (1104), file system information about the folder and associated folder contents are pre-fetched (downloaded) without further request (e.g., from the displaying application or tool) or user action (1106). In various embodiments, folder metadata and content items (documents) may be downloaded recursively based on the pre-fetch hint. If the pre-fetch hint is not set, just the folder information and a list of contents are downloaded (at least initially) (1108).

Figure 12:
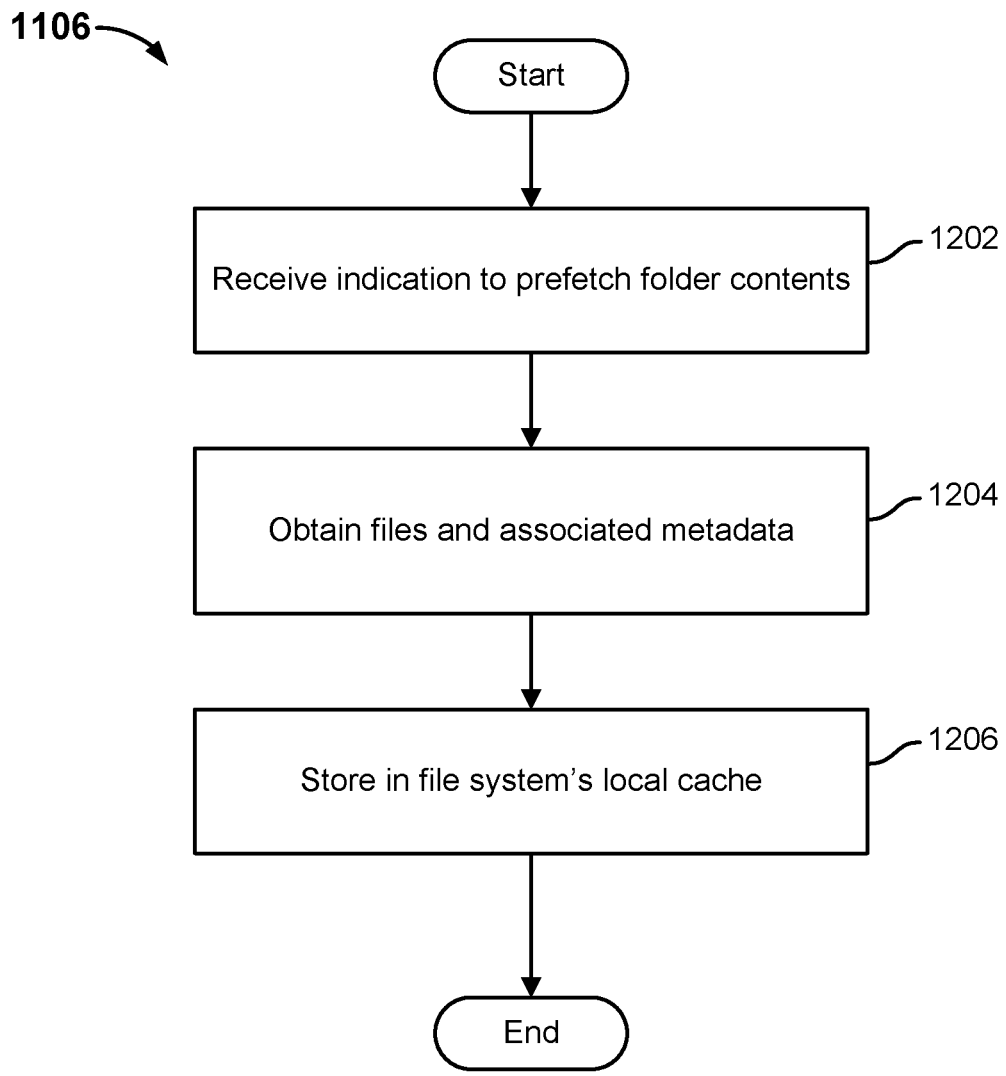
FIG. 12 is a flow chart illustrating an embodiment of a process to prefetch file system data.

FIG. 12 is a flow chart illustrating an embodiment of a process to prefetch file system data. In various embodiments, the process of FIG. 12 may be used to implement and/or included in step 1106 of FIG. 11. In the example shown, an indication is received to pre-fetch from a distributed file system folder content data (1202). The folder contents, e.g., files and associated metadata, are obtained from the distributed file system (1204). In some embodiments, obtaining (pre-fetching) folder contents may involve one or more calls to a remote file system metadata server and/or one or more requests to a cloud-based or other object store. Downloaded objects are stored locally (i.e., at the client device/system) in a file system local cache (1206), such as cache 210 of FIG. 2.

Figure 13:
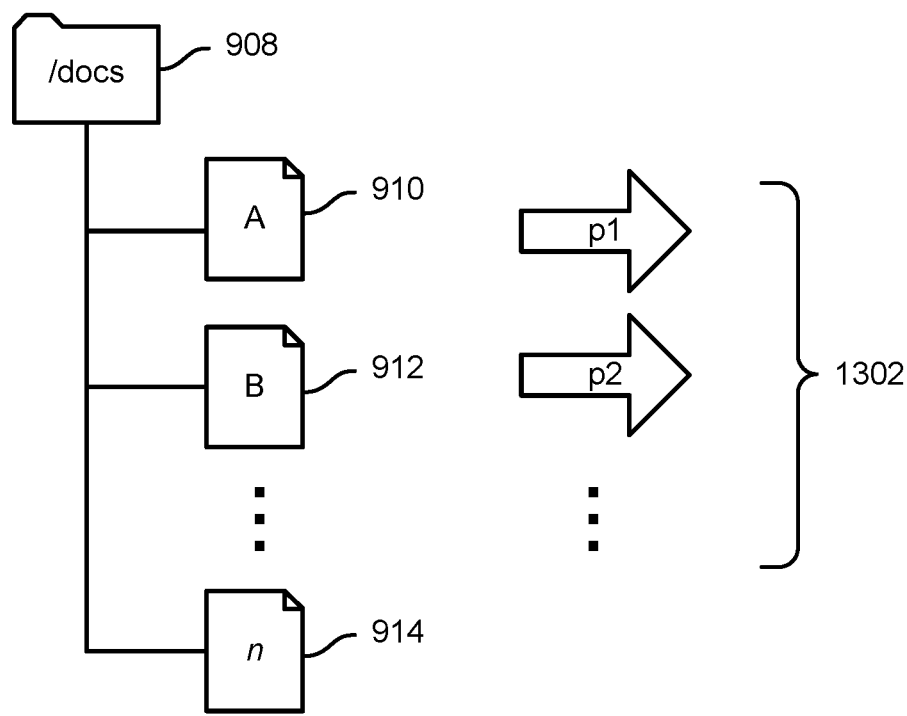
FIG. 13 is a block diagram illustrating an embodiment of a system to download file system objects based at least in part on a user pre-fetch hint.

FIG. 13 is a block diagram illustrating an embodiment of a system to download file system objects based at least in part on a user pre-fetch hint. In the example shown, rather than iterate serially through the files (or other objects) comprising the folder with respect to which a pre-fetch is being performed, the file system client uses multiple processing threads 1302 to download (pre-fetch) multiple files or other objects from the file system in parallel. In some embodiments, the fetched content is stored at least initially in the client agent's cache and is subsequently used to serve the serially issued requests by the application, enabling such requests to be served quickly and efficiently from locally cached content. In various embodiments, downloading folder contents in parallel enables a distributed file system to better approximate the user experience that may be associated with pre-fetch operations performed with respect to a local (not distributed) file system, in terms of the time it takes to be ready to provide information the user may next attempt to access. In various embodiments, the disclosed user-driven approach enables such efficiencies to be achieved while avoiding the inefficiency that could result if the client agent or other software instead were configured to attempt to predict the need to pre-fetch, without an explicit hint from the user. For example, in the latter approach (pre-fetching without a hint) the file system agent could become busy performing unneeded pre-fetch work, resulting in delays in performing other tasks, and/or could consume network bandwidth and/or other resources performing unneeded work.

In various embodiments, techniques disclosed herein may be used to provide user-driven pre-fetch with respect to user interactions with a file system directory.

Using techniques disclosed herein may enhance the user experience while not using client and/or network resources to perform file system pre-fetch operations that a user may not desire.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing access to file system information, comprising:
   receiving, by a file system client running on a client device an indication that a user input associated with pre-fetching at least metadata pertaining to a file system object has been received, wherein the file system object is stored in a distributed file system;
   determining, by one or more processors of the client device, that one or more predefined user inputs or user actions occurred; and
   pre-fetching, by the file system client, content data associated with a file system object, wherein the pre-fetching the content data associated with the file system object comprises:
      in response to a determination that a user-driven pre-fetch option has been set as active with respect to the file system object recursively downloading folder metadata and content items associated with a folder based at least in part on a user-defined scope of the pre-fetching and storing the folder metadata and content items in a local cache of the client device, wherein the folder metadata and content items are downloaded in response to determining that the one or more predefined user inputs or user actions occurred, and the one or more predefined user inputs or user actions correspond to a context for which a response does not expressly require the folder metadata.

2. The method of claim 1, wherein the pre-fetching of the content data associated with the file system object further comprises:
   in response to a determination that the user-driven pre-fetch option has not been set as active with respect to the file system object, the folder metadata is downloaded in response to an express indication to download the folder metadata or in response to a request for which a response requires the folder metadata.

3. The method of claim 1, wherein the scope of the pre-fetching is based at least in part on whether a user-driven pre-fetch option has been set as active or in active.

4. The method of claim 1, wherein the scope of the pre-fetching is based at least in part on one or more contexts in response to which pre-fetch of the file system object is to be performed.

5. The method of claim 1, further comprising:
   determining, by one or more processors, that the user-driven pre-fetch option has been set as active with respect to the file system object,
   wherein the content data associated with the file system object is pre-fetched in response to at least a determination that the user-driven pre-fetch option has been set as active with respect to the file system object.

6. The method of claim 2, further comprising:
   determining, by one or more processors, the predefined one or more user inputs or user actions in response to which pre-fetch of the file system object is to be performed.

7. The method of claim 1, wherein the predefined one or more user inputs or user actions comprises a drag and drop action performed with respect to a representation of the file system object as displayed in a user interface.

8. The method of claim 7, wherein the user interface is provided by an application or tool used to display file system information provided by the file system client.

9. The method of claim 8, wherein the file system client is configured to obtain the file system information from a remote file system metadata server.

10. The method of claim 9, wherein pre-fetching the content data comprises requesting the content data from the remote file system metadata server without first receiving an explicit user request for the content data.

11. The method of claim 1, wherein the file system object comprises a folder or other logical container.

12. The method of claim 11, wherein the contents comprises one or both of subfolders and files associated with the folder or other logical container.

13. The method of claim 1, wherein the content data comprises a plurality of files or other file system objects and pre-fetching the content data comprises using a plurality of processing threads to download in parallel multiple ones of the files or other file system objects.

14. The method of claim 1, wherein the file system client is configured to download only a listing of contents of the file system object in instances in which the user-driven pre-fetch option has not been set.

15. The method of claim 1, further comprising providing a context menu option or other control to enable the pre-fetch option to be set.

16. A computer system, comprising:
   a storage device configured to store a local cache;
   a processor coupled to the storage device and configured to:
      receive, via a file system client running on a client device, an indication that a user input associated with pre-fetching at least metadata pertaining to a file system object has been received, wherein the file system object is stored in a distributed file system;
      determine that one or more predefined user inputs or user actions occurred; and
      pre-fetch, by the file system client, content data associated with a file system object, wherein the pre-fetching the content data associated with the file system object comprises:
         in response to a determination that a user-driven pre-fetch option has been set as active with respect to the file system object recursively download folder metadata and content items associated with a folder based at least in part on a user-defined scope of the pre-fetching and store the folder metadata and content items in a local cache of the client device, wherein the folder metadata and content items are downloaded in response to determining that the one or more predefined user inputs or user actions occurred, and the one or more predefined user inputs or user actions correspond to a context for which a response does not expressly require the folder metadata.

17. A computer program product to provide access to file system information, the computer program product being embodied in a non-transitory computer readable storage medium and comprising computer instructions for:
- receiving, by a file system client running on a client device an indication that a user input associated with creating a local copy of a file system object has been received, wherein the file system object is stored in a distributed file system;
- determining, by one or more processors of the client device that one or more predefined user inputs or user actions occurred; and
- pre-fetching, by the file system client, content data associated with a file system object, wherein the pre-fetching the content data associated with the file system object comprises:
  - in response to a determination that a user-driven pre-fetch option has been set as active with respect to the file system object recursively downloading folder metadata and content items associated with a folder based at least in part on a user-defined scope of the pre-fetching and storing the folder metadata and content items in a local cache of the client device, wherein the folder metadata and content items are downloaded in response to determining that the one or more predefined user inputs or user actions occurred, and the one or more predefined user inputs or user actions correspond to a context for which a response does not expressly require the folder metadata.

18. The method of claim 1, wherein the user input associated with the pre-fetching the at least metadata pertaining to the file system object comprises: a right click on the file system object and a user selection to activate the pre-fetching.

19. The method of claim 1, wherein the recursively downloading of the folder metadata and the content items associated with the folder comprises using a plurality of processing threads to pre-fetch the folder metadata and the content items from the distributed file system in parallel.

* * * * *